June 23, 1942.  J. E. GODWIN  2,287,678
IDENTIFICATION DEVICE
Filed March 25, 1941  2 Sheets-Sheet 1

INVENTOR
James Edwin Godwin
BY
ATTORNEY

June 23, 1942.  J. E. GODWIN  2,287,678

IDENTIFICATION DEVICE

Filed March 25, 1941   2 Sheets-Sheet 2

INVENTOR
James Edwin Godwin
BY
ATTORNEY

Patented June 23, 1942

2,287,678

UNITED STATES PATENT OFFICE 2,287,678

IDENTIFICATION DEVICE

James Edwin Godwin, New York, N. Y.

Application March 25, 1941, Serial No. 385,043

9 Claims. (Cl. 35—21)

This invention relates to new and useful improvements in an identification device.

The invention proposes a construction of an identification device of a nature to positively identify a person. The purpose of the invention is to prevent sabotage of employees working in government departments such as the navy yards, arsenals, plane factories, etc., and also for private corporations such as powder plants, etc. connected with the present defense program.

The invention proposes to so construct the identification device that each person entering a plant will be immediately identified at entrance without the necessity of passes, buttons, photographs, or other identification insignia. It is known that such identification insignia may be stolen or forged, and usually the possessor of such fraudulent material can gain entrance to a plant. However, with the instant arrangement this is impossible.

More particularly, the invention proposes to characterize the identification device by a tape for receiving finger print impressions from a person desiring to enter. An arrangement is provided for projecting these prints on a screen. A simultaneous arrangement is also provided for projecting the plant's record of this person upon the same or an adjacent screen. It is proposed that this record include the finger prints. In this way the identification material on the screen may be instantly compared with the identification of the person, and if found in order, he is permitted to enter.

It is also proposed that a gate be provided for the plant which may be released to allow a person to pass if the identification is proper.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
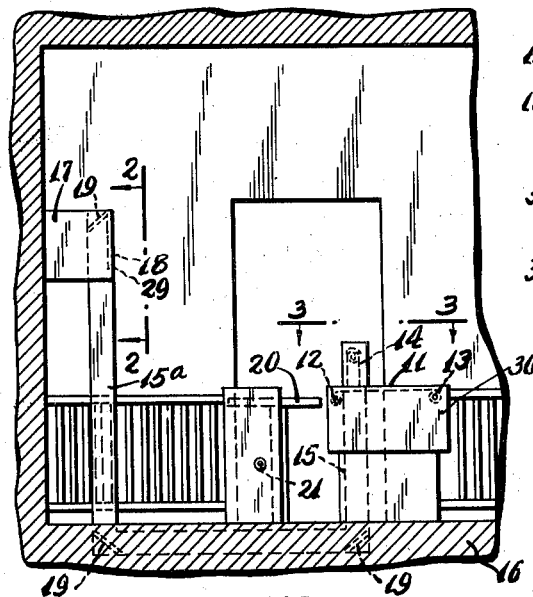
Fig. 1 is a sectional view of the entrance to a plant provided with an identification device constructed in accordance with this invention.
Figure 3:
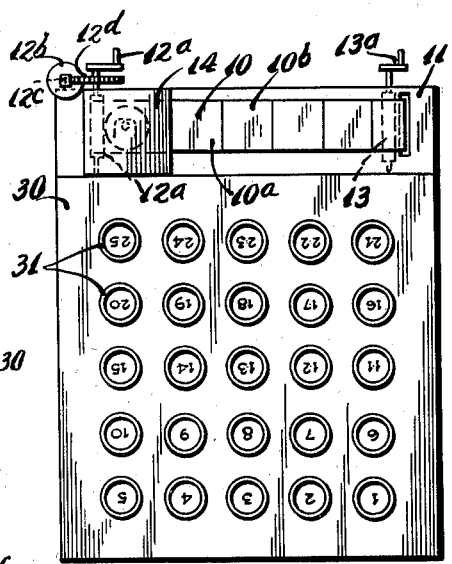
Fig. 3 is a fragmentary plan view of a portion of the device looking in the direction of the line 3—3 of Fig. 1.
Figure 4:
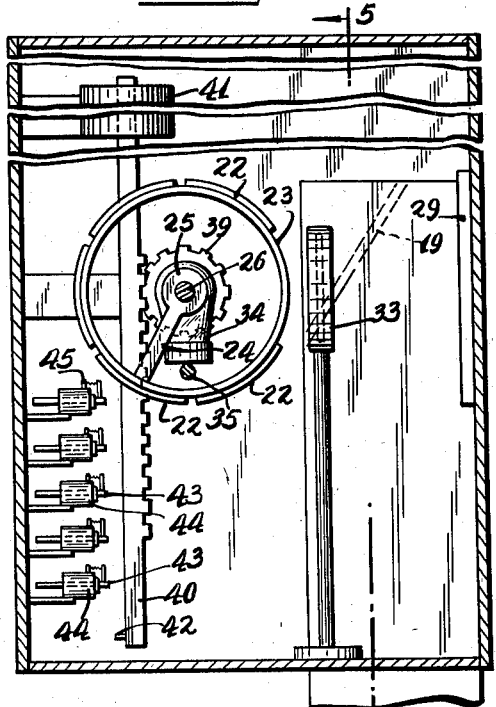
Fig. 4 is a fragmentary enlarged vertical sectional view taken on the line 4—4 of Fig. 2.

The identification device, in accordance with this invention, includes a tape 10 for receiving finger print impressions. This tape is printed with a plurality of adjacent spaces 10a, 10b, etc., which may be selectively used. The tape is mounted upon a table 11 and is extended between the rollers 12 and 13 (see Fig. 1) in a manner so that the tape may be manually advanced when desired. These rollers are provided with handles 12a and 13a, respectively by which the tape may be advanced or turned back. The tape 10 may also be moved by pressing a push button 12b which carries a rack bar 12c and is in mesh with a one way acting gear 12d mounted on the axle of the handle 12a. A projector 14 is mounted upon the table 11 and is adapted to project finger prints from the tape upon a screen. More particularly, the projector 14 shines through the tape into a conduit 15 which extends down into the floor 16 and then along the floor and up along the portion 15a to the box 17 which is provided with the screen 18. This conduit 15 has a plurality of reflecting surfaces 19, such as mirrors arranged at angular positions so as to reflect the projected image on the screen 18, in enlarged form.

The table 11 is arranged adjacent a gate 20 by which persons may enter the plant. However, the gate 20 is locked unless released by a control button 21 or some other arrangement. The details of the gate will not be given in this specification since it forms no part of the invention and gates of this type are generally known.

The identification device also includes a plurality of records 22 giving identification data of persons entitled to enter the plant. These records 22 are shown mounted upon a transparent drum 23. This drum is provided at each end with a single supporting spoke 24 connected with a hub portion 25 upon which a supporting shaft 26 is mounted. The shaft 26 is supported in suitable bearings 27, 28. Means is provided for selectively projecting the said records 22 upon a screen 29 located on the box 17 adjacent the screen 18. It is proposed that the records 22 be in the nature of films or lantern slides. For each person there is one slide with the person's photograph and also his finger prints and other data such as templets of prints and card system, etc.

The means for selectively projecting said records includes a keyboard 30 mounted upon the table. The keys 31 of this board are provided with identification numerals, one key for each person. These keys represent person's records upon the drum 23 which are in the form of said films or slides 22. A lens projector 33 is mounted within the box 19 at one location in line with the rear of the screen 29. A lamp 34 is supported within the drum 23 at a location directly behind the lens 33. More specifically, the lamp 34 is supported on a bar 35 extended through the drum 23 and mounted on the support brackets 36 which are stationarily mounted within the box 17. The shaft 26 is in the nature of stud shaft sections 26$^a$ and 26$^b$. These sections are attached to the hub portions 25 and extend outwards. They do not pass through the drum 23.

A solenoid 35 is connected with the stud shaft 26 and is arranged to move the shaft longitudinally and so correspondingly move the drum 23. A plurality of pins 36 are arranged along the longitudinal length of the drum 23 and are associated with a control mechanism by which one of these pins may be extended into the path of motion of the drum to arrest the longitudinal motion of the drum. Specifically, each pin 36 is connected with the core of a magnet 37. Springs 38 normally retract the pins 36. When a magnet is energized its pin 36 is extended.

The stud shaft 26$^b$ is provided with a key 38 extending along its length. A gear 39 is rotatively supported upon the standard 28 and is provided with a key slot accommodating the key 38. The arrangement is such that the gear 39 may be turned for turning the shaft 26$^b$ and thus the drum 23. However, this turning does not interfere with the longitudinal movement of the drum 23 imparted to it by the solenoid 35. A rack 40 meshes with the gear 39. This rack 40 is slidably supported and connected with the core of a solenoid 41. The rack 40 is provided with a pin 42. A plurality of pins 43 are arranged along the longitudinal length of the rack 40.

Each pin 43 is connected with the core of an electro-magnet 44. Springs 45 normally retract the pins 43. When any one of the electro-magnets is energized its pin 43 will be extended into the path of motion of the pin 42 so as to arrest the motion of the rack 40.

Figure 7:
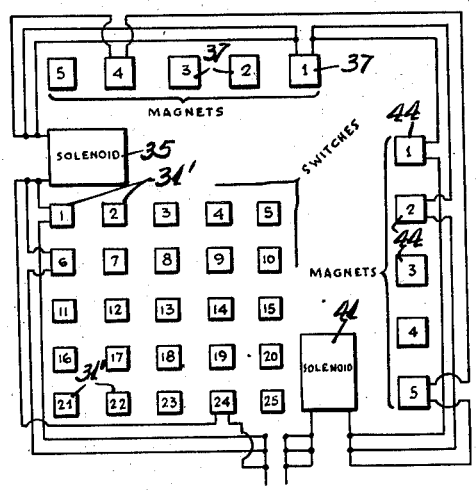
Fig. 7 is a schematic wiring diagram of the device.
Figure 6:
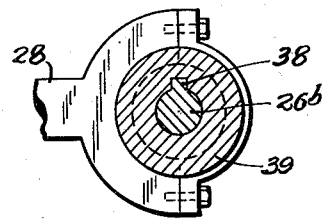
Fig. 6 is a fragmentary sectional view taken on the line 6—6 of Fig. 5.

The electro-magnets 37 and 44, and the solenoids 35 and 41 are connected up in a circuit as illustrated in Fig. 7. There is a switch 31' for and beneath each key 31. Each switch 31' is connected in series with one of the electro-magnets 37 and with one of the electro-magnets 44, and with the said solenoids 35 and 41. Thus when any key 31 is depressed it closes one of the switches 31', which in turn causes the energization of the solenoids 35 and 41 and of one of the electro-magnets 37 and one of the electro-magnets 44.

Figure 2:
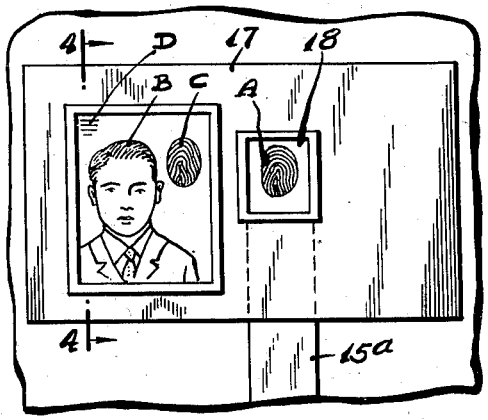
Fig. 2 is a fragmentary elevational view looking in the direction of the line 2—2 of Fig. 1.

The operation of the device is as follows:

Before a person is admitted through the gate 20 it is required that he impress his finger prints on the tape 10 and then turn the handle 12$^a$ to advance the finger prints beneath the projector 14. The projector 14 projects the finger prints upon the screen 18, as illustrated in Fig. 2 and indicated by reference letter A. Then the person must depress one of the keys 31, corresponding with the number assigned to him. Depression of the key 31 closes one of the switches 31' and energizes the solenoids 35 and 41 and one electro-magnet of the group of magnets 44 and one electro-magnet of the group of magnets 37. The pin of the particular electro-magnet of the group of magnets 37 energized will immediately be projected upwards into the path of motion of the drum 23. Similarly, the pin 43 of the magnet of the group of magnets 44 energized will also be projected.

Figure 5:
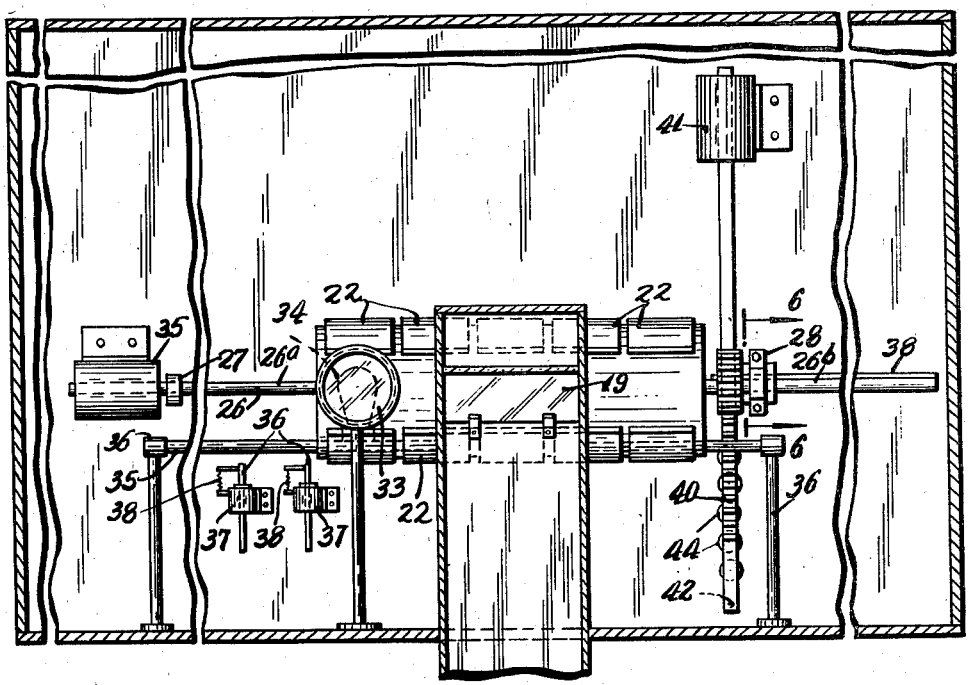
Fig. 5 is a fragmentary enlarged vertical sectional view taken on the line 5—5 of Fig. 4.

The solenoid 35 will cause the drum 23 to move towards the left, as illustrated in Fig. 5, until the drum is arrested by the projected pin. The solenoid 41 will move the rack 40 to rotate the gear 39 and turn the drum 23 to a position in which the pin 42 of the rack strikes the projecting pin 43. Thus the drum 23 will come to rest at a position in which one of the slides 22 will be located behind the lens 33. The lamp 34 is then lit, and will project the data from the particular slide 22 on the screen 29. This data may comprise the photograph B of the person to be identified and the finger prints C. It also may include descriptive matter D. The watchman at the gate 20 then compares the data with the person seeking admission, and if everything is in order, he permits him to enter.

It is to be understood that the keyboard 30 may include any desired number of keys 31, depending upon the size of the plant or the number of employees who are to be checked by this identification device.

The finger prints projected on the screen 18 may be matched by the finger print record C on screen 29 and by a suitable device the control button 21 of gate 20 may be made to operate automatically whenever the two finger prints correspond, to open the gate and to permit the identified person to pass through the gate.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape.

2. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said means for projecting the indicia of said tape, comprising a conduit extending from said tape to one screen of said casing, and a projector at the end of said conduit having said tape for projecting the identification indicia of said tape through said conduit.

3. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said means for rotating said tube, comprising a shaft upon which said tube is mounted, a bushing having a central opening through which one end of said shaft slidably but non-rotatively extends, a gear fixedly mounted on said bushing, a solenoid having an extended core formed with gear teeth meshing with said gear, and means for controlling the distance said core will move when said solenoid is energized to control the distance said tube will be rotated.

4. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said means for rotating said tube, comprising a shaft upon which said tube is mounted, a bushing having a central opening through which one end of said shaft slidably but non-rotatively extends, a gear fixedly mounted on said bushing, a solenoid having an extended core formed with gear teeth meshing with said gear, and means for controlling the distance said core will move when said solenoid is energized to control the distance said tube will be rotated, said latter means, comprising a pin extending from said core, and a plurality of electro-magnets having slidable cores selectively extendable into the path traversed by said pin to be contacted by said pin and limit said core against further movement.

5. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said means for rotating said tube, comprising a shaft upon which said tube is mounted, a bushing having a central opening through which one end of said shaft slidably but non-rotatively extends, a gear fixedly mounted on said bushing, a solenoid having an extended core formed with gear teeth meshing with said gear, and means for controlling the distance said core will move when said solenoid is energized to control the distance said tube will be rotated, said latter means, comprising a pin extending from said core, and a plurality of electro-magnets having slidable cores selectively extendable into the path traversed by said pin to be contacted by said pin and limit said core against further movement, each of said magnets being connected in a circuit including said solenoid and a switch, whereby when one of said switches is closed it will complete its respective circuit and energize its respective magnet and solenoid to rotate said tube through a predetermined distance.

6. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said means for moving said tube longitudinally, comprising a solenoid having a core upon the extended end of which said tube is coaxially mounted in end alignment, and means for limiting the distance through which said core may move when said solenoid is energized, whereby when said solenoid is energized said tube will be moved longitudinally through a predetermined distance.

7. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said means for moving said tube longitudinally, comprising a solenoid having a core upon the extended end of which said tube is coaxially mounted in end alignment, and means for limiting the distance through which said core may move when said solenoid is energized, whereby when said solenoid is energized said tube will be moved longitudinally through a predetermined distance, said latter means, comprising a pin extending from said core, and a plurality of electro-magnets having slidable cores selectively extendable into the path traversed by said pin to be contacted by said pin and limit said core against further movement.

8. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said means for moving said tube longitudinally, comprising a solenoid having a core upon the extended end of which said tube is coaxially mounted in end alignment, and means for limiting the distance through which said core may move when said solenoid is energized, whereby when said solenoid is energized said tube will be moved longitudinally through a predetermined distance, said latter means, comprising a pin extending from said core, and a plurality of electro-magnets having slidable cores selectively extendable into the path traversed by said pin to be contacted by said pin and limit said core against further movement, each of said electro-magnets being connected in a circuit including said solenoid and a switch, whereby when one of said switches is closed said solenoid and one of said magnets will be energized to move said tube.

9. An identification device having a casing with a pair of adjacent screens, a transparent tape for receiving identification indicia, means for projecting the indicia of said tape onto one of said screens, a tube rotatively and longitudinally slidably supported within said casing behind the other of said screens, a plurality of slides mounted on said tube and having printed identification indicia to be compared with said first mentioned identification indicia, means for rotating and moving said tube longitudinally to align a desired slide with said second screen, and means for projecting the indicia of the aligned slide onto said second screen so that the printed identification indicia of said slide may be compared with the identification indicia of said tape, said latter means, comprising a lens disposed between said tube and said screen, and a source of light within said tube for projecting the identification indicia of said slide aligned with said second screen through said lens to be enlarged thereby and onto said second screen.

JAMES EDWIN GODWIN.